Patented Mar. 30, 1954

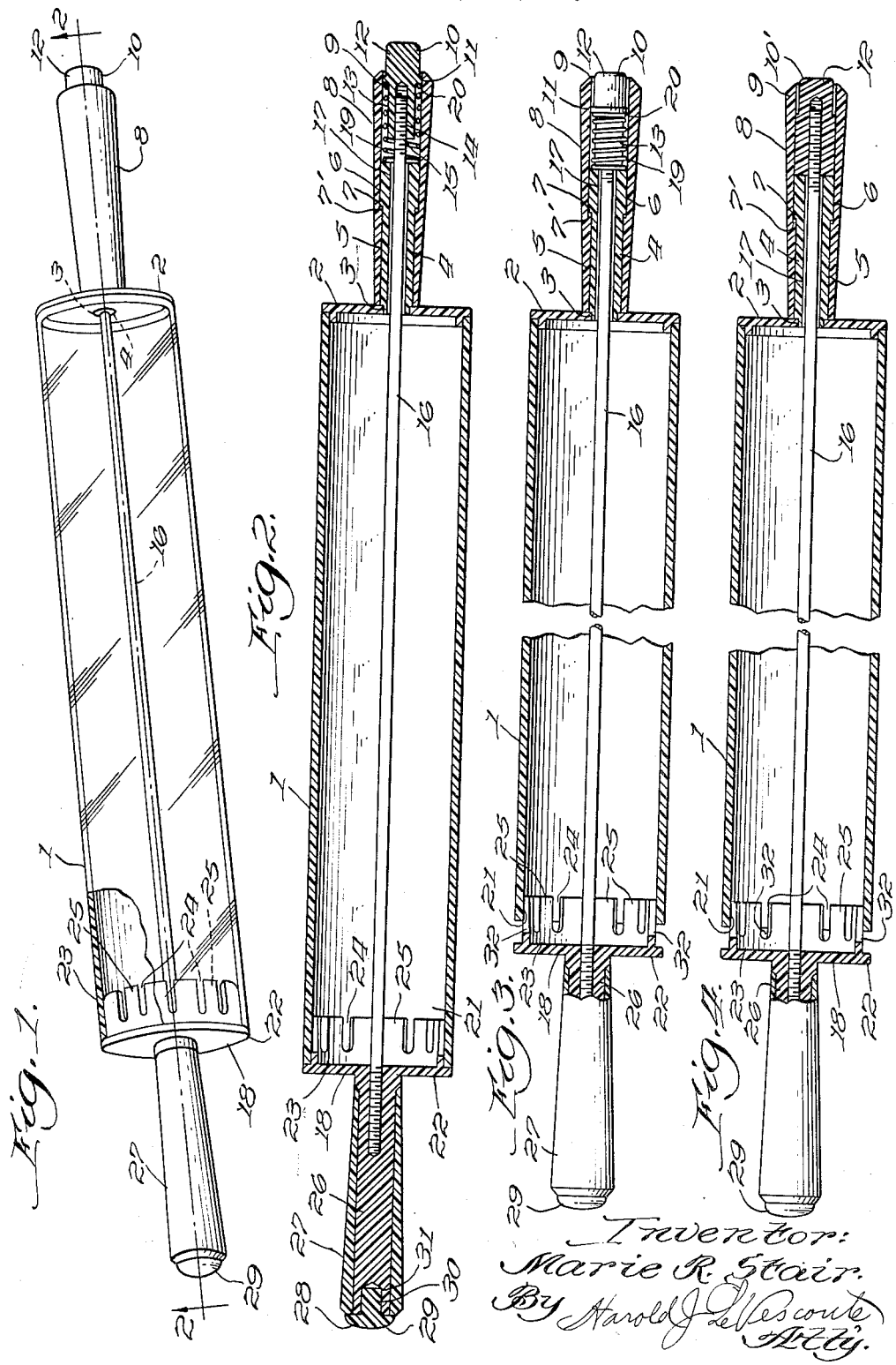

2,673,532

UNITED STATES PATENT OFFICE 2,673,532

FLOUR DISPENSING ROLLING PIN

Marie R. Stair, Glendale, Calif.

Application September 5, 1950, Serial No. 183,193

3 Claims. (Cl. 107—50)

This invention relates to rolling pins and particularly to a form thereof including flour dispensing means.

In rolling dough in the preparation of pastry or other food products, it is necessary from time to time to coat the dough with flour to prevent the dough from sticking to the rolling pin. This requires that the rolling pin be set down and the flour taken from a container and sprinkled on the dough after which the rolling operation is again continued.

With the above consideration in mind it is an object of the present invention to provide a rolling pin having a flour containing cavity and from which the flour may be dispensed from time to time during a rolling operation without the necessity of setting the rolling pin down to coat the dough.

Another object of the invention is to provide a rolling pin having a flour containing cavity within the roller portion and a normally closed series of openings therein through which the flour may be dispensed as desired.

A further object of the invention is to provide a rolling pin having a transparent hollow roller body adapted to contain a quantity of flour and having means operated by the handles of the rolling pin to permit the dispensing of the flour contained within the roller body.

Still another object of the invention is to provide a rolling pin having a flour containing cavity and a normally closed dispensing opening which is so constructed and arranged that the closure means may be displaced for filling the cavity.

A still further object of the invention is to provide a rolling pin in which the above objectives are realized in practice and which is simple in construction and economical to manufacture, which is easy to clean and which is sturdy and reliable in use.

With the foregoing objects in view, together with such additional objects and advantages as may subsequently appear, the invention resides in the parts, and in the construction, combination, and arrangement of parts described, by way of example, in the following specification; reference being had to the accompanying drawings which form a part of said specification and in which drawings:

Fig. 1 is a side elevation, slightly in perspective, of a rolling pin embodying one form of the invention, Fig. 2 is a longitudinal medial section taken on the line 2—2 of Fig. 1, Fig. 3 is a view similar to Fig. 2 but showing the component parts moved to permit the dispensing of flour incident to the use of the rolling pin, and Fig. 4 is a longitudinal medial sectional view of a modified form of the invention.

Referring first to the form of the invention shown in Figs. 1, 2 and 3, the rolling pin comprises a hollow, cylindrical body member 1 formed from transparent material such as a rigid type of plastic; said body member having an end member 2 fixed thereto by welding or cementing or the end member 2 may be molded as an integral part of the body member. The end member 2 is provided with an axially disposed opening 3 in which one end of a hollow handle spindle 4 is secured by cementing or other appropriate means. The handle spindle 4 adjacent the end member 2 has a smaller outside diameter portion 5 and the distal end of the handle portion has a larger outside diameter portion 6; the juncture of the portions 5 and 6 forming a shoulder 7 and freely rotatably mounted on the handle spindle is a handle 8 having larger and smaller inside diameter portions engaging the portions 5 and 6 and forming a shoulder 7' engageable with the shoulder 7 to restrain the handle against endwise movement on the spindle except for sufficient play to permit free rotation thereon (see Figs. 2 and 3).

The handle 8 extends beyond the distal end of the spindle 4 and the larger internal diameter 9 of the handle affords guidance for a button element 10 having a circumferential rib 11 slidably engaging the interior surface of the handle and having an end portion 12 normally extending beyond the end of the handle as shown in Fig. 2. The inner end 13 of the button element 10 is smaller in diameter than the rib 11 and is provided with a threaded axial bore 14 engaged by the threaded end 15 of a resilient rod 16 which extends from the button element 10 through the axial bore 17 in the spindle 4 through the interior of the body member 1 and threadedly engages the closure member 18 at the opposite end of the body member 1. A compression spring 19 loosely mounted on the inner end 13 of the button element 10 and reacting between the end of the spindle 4 and the shoulder 20 formed by the juncture of the end portion 13 and the rib 11 of the button element 10 serves constantly to urge the button element toward the outer end of the handle and through the rod 16 attached to the button to urge the closure member 18 toward the open end 21 of the body member.

The closure member 18 comprises a disc portion 22 of the same diameter as the body member 1 having an integral skirt portion 23 extending into and frictionally engaging the open end 21 of the body member; the skirt portion 23 being provided with a plurality of slots 24 which form the free end of the skirt portion into a series of tongue elements 25 and serve additionally as dispensing openings for flour as will hereinafter be explained. At the opposite side of the disc portion 22 is an integrally formed handle spindle 26 on the outer surface of which is mounted a freely rotatable handle element 27 secured against endwise movement thereon by the head 28 of a button element 29 having a shank 30 cemented or otherwise secured in an axial bore 31 in the outer end of the spindle 26.

Assuming that the rolling pin is to be put into use, the button element 10 is unscrewed from the end of the rod 16 a sufficient amount so that upon pressing inwardly on the button element the end of the skirt portion 23 of the closure member 18 will be moved beyond the open end of the body member. The closure member is then moved to one side and the desired amount of flour poured into the body member after which the closure member is replaced and the button element is screwed back on the rod 16 as far as it will go. When it is desired to sprinkle flour on the dough mass, the button element 10 is pressed inwardly or alternatively, the handle elements 8 and 27 are pulled away from each other against the resistance offered by the spring 19 to the extent permitted by the engagement of the inner end of the button element 10 with the outer end of the handle spindle 4 thus moving the closure member 18 outwardly sufficiently to expose the inner ends of the slots 24 to provide openings 32 through which flour may be sprinkled on the dough mass (see Fig. 3). Upon release of the opening pressure, the spring will draw the closure member back into the end of the body member and the rolling operation may proceed.

Referring now to Fig. 4, the construction is generally the same as the first described form of the invention and all identical parts have been given the same identifying numerals. The difference is that the spring is dispensed with and the button 10' engages the inner surface of the handle element throughout substantially the length of the button element. The filling of the body member is accomplished in the same manner as has been described and the opening and closure of the dispensing openings is effected by manually moving the handles of the rolling pin away from and toward each other; the closure being maintained by inward pressure on the handles during the rolling operation.

While I have described and illustrated certain modes of execution of my invention in the foregoing specification, I do not intend to limit myself to the exact forms thus disclosed, and the invention includes all such modifications in the parts, and in the construction, combination, and arrangement of parts as shall come within the purview of the appended claims.

I claim:

1. In a rolling pin, the combination of a hollow, cylindrical body member, a fixed closure element at one end thereof including a spindle element carrying a freely rotatable handle axially aligned with said body member, a movable closure element at the opposite end of said body member comprising a disc having a diameter greater than the internal diameter of said body member and having a slotted skirt portion slidingly engaging the internal wall surface of said body member on one face of said disc, a freely rotatable handle axially aligned with said body member carried by the opposite face of said disc and means connected to said movable closure element effective to limit the extent of opening movement thereof; said means comprising a rod extending axially of said body member and having one end thereof fixed to said movable closure element and the other end extending through said spindle element, and a stop means carried by said other end movable toward and away from the free end of said spindle element.

2. In a rolling pin, the combination of a hollow, cylindrical body member, a fixed closure element at one end thereof including a spindle element carrying a freely rotatable handle axially aligned with said body member, a movable closure element at the opposite end of said body member comprising a disc having a diameter greater than the internal diameter of said body member and having a slotted skirt portion slidingly engaging the internal wall surface of said body member on one face of said disc, a freely rotatable handle axially aligned with said body member carried by the opposite face of said disc and means connected to said movable closure element effective to limit the extent of opening movement thereof; said means comprising a rod extending axially of said body member and having one end thereof fixed to said movable closure element and the other end extending through said spindle element, a stop means carried by said other end movable toward and away from the free end of said spindle element and a spring interposed between said stop means and said spindle element normally operative to maintain said closure element in closed position.

3. In a rolling pin, a hollow, cylindrical body member closed at one end and open at the other end thereof, a hollow spindle fixed to the outer face of said closed end and disposed in axial alignment with said body member, a handle freely rotatable on the outer surface of said spindle, a removable closure means at the open end of said body member including an end portion of the same diameter as said body member, a skirt portion closely fitting the inner perimeter of said body member and having openings extending therethrough through which flour contained in said body member may be dispensed upon partial removal of said closure member, a second freely rotatable handle mounted on the outer face of said end portion and disposed in axial alignment with said first handle, and a rod fixed to said end portion and extending axially of said body member and through said hollow spindle, and means on the distal end of said rod cooperatively associated with the distal end of said hollow spindle effective to limit the extent of opening movement of said removable closure member.

MARIE R. STAIR.

References Cited in the file of this patent
UNITED STATES PATENTS

| Number | Name | Date |
| --- | --- | --- |
| 599,171 | Fowler | Feb. 15, 1898 |
| 1,254,298 | Anton | Jan. 22, 1918 |
| 2,071,422 | Newlin | Feb. 23, 1937 |